United States Patent
Julien (10) Patent No.: US 8,989,549 B2
(45) Date of Patent: Mar. 24, 2015

(54) TOPOLOGY-DEFINING CARDS FOR OPTICALLY INTERCONNECTED TELECOMMUNICATION SYSTEMS

(75) Inventor: Martin Julien, Laval (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 169 days.

(21) Appl. No.: 13/598,222

(22) Filed: Aug. 29, 2012

(65) Prior Publication Data
US 2014/0064691 A1    Mar. 6, 2014

(51) Int. Cl.
| | | |
|---|---|---|
| *G02B 6/00* | (2006.01) | |
| *G02B 6/12* | (2006.01) | |
| *G02B 6/28* | (2006.01) | |
| *G02B 6/36* | (2006.01) | |
| *H04J 14/02* | (2006.01) | |
| *H04Q 1/02* | (2006.01) | |

(52) U.S. Cl.
CPC . *G02B 6/36* (2013.01); *H04J 14/02* (2013.01); *H04Q 1/15* (2013.01)
USPC .............. 385/135; 385/14; 385/24; 385/53; 385/88; 385/92

(58) Field of Classification Search
CPC .. G02B 6/3825; G02B 6/3897; G02B 6/4452; H04Q 11/0001
USPC ............... 385/14, 16–21, 53, 59, 88–92, 114, 385/134–136, 139, 24, 46, 50; 398/164
See application file for complete search history.

(56) References Cited

U.S. PATENT DOCUMENTS

| | | | |
|---|---|---|---|
| 2003/0039014 A1 | 2/2003 | English | |
| 2005/0100340 A1* | 5/2005 | Nishimura | 398/135 |
| 2009/0148116 A1* | 6/2009 | Yanagimachi et al. | 385/135 |
| 2010/0214755 A1 | 8/2010 | Groschner et al. | |

FOREIGN PATENT DOCUMENTS

EP    2469745 A1    6/2012

* cited by examiner

*Primary Examiner* — Akm Enayet Ullah
*Assistant Examiner* — Michael Mooney
(74) *Attorney, Agent, or Firm* — Murphy, Bilak & Homiller, PLLC (57) ABSTRACT

Topology-defining card units are used to provide optical interconnections between multiple slots of an equipment subrack. An example card unit is adapted for installation in a slot of an equipment subrack having a plurality of slots and having a backplane. The card unit includes one or more back-side optical connectors configured so as to mate with corresponding optical connector receptacles on the backplane of the equipment subrack when the card unit is installed in the equipment subrack. These one or more back-side optical connectors include a plurality of card-unit optical interfaces. The card unit further includes an optical interconnection network that optically couples each one of the plurality of card-unit optical interfaces to another one of the plurality of card-unit optical interfaces.

14 Claims, 8 Drawing Sheets

TOPOLOGY-DEFINING CARDS FOR OPTICALLY INTERCONNECTED TELECOMMUNICATION SYSTEMS

TECHNICAL FIELD

The present invention generally relates to optical telecommunication systems, and more particularly relates to techniques for managing optical interconnections between optical equipment.

BACKGROUND

Because telecommunication systems are handling increasing quantities of data traffic, optics-based equipment and solutions are gaining momentum. Optical fibers are now commonly used to interconnect systems that require a large network bandwidth over long distances, with a relatively low cost compared to copper cables. As systems grow and optical solutions become more affordable, system designers are also beginning to use optical components and interconnections for short-range communications within systems as well as for long-range connections between systems.

In large-capacity systems, it is common to use a system design that uses an equipment "chassis" as the form factor. An equipment chassis is often called a "subrack," or "card cage," or "subrack card cage." In the remainder of this document, the term "subrack" is used, although it should be understood that this term is interchangeable with "chassis" and "card cage."

Typically, a certain number of printed circuit board (PCB) "blades" can be slid into and plugged into a subrack. Further, several such subracks can be installed in a rack, allowing system designers to build a scalable system. In order to allow the different blades to communicate with one another, each blade needs to be connected to a backplane, which is responsible for carrying the communication signals between the blades.

Figure 1:
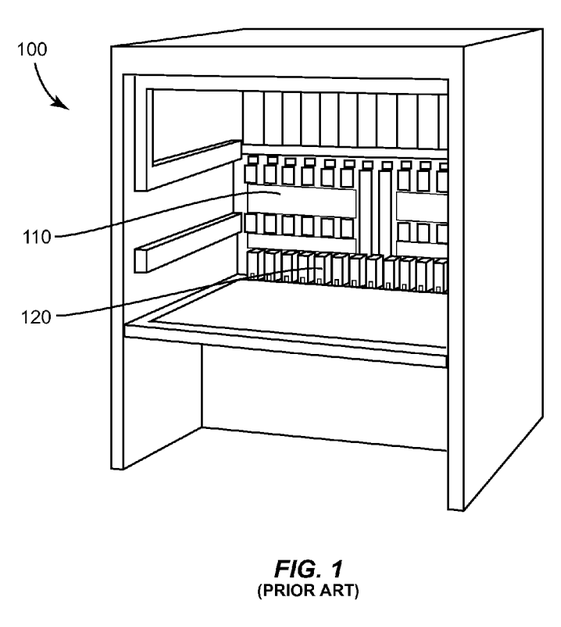
FIG. 1 illustrates an example equipment subrack and its backplane.

Typically, a backplane is passive, i.e., it does not require any external electrical power, and is built in such a way that copper traces can be used to exchange information between the blades. FIG. 1 shows an example subrack 100, which can support several cards or blades that are interconnected together through the backplane 110. Backplane 110 has several connectors 120 for connecting each card to it and thus to one another.

Figure 2:
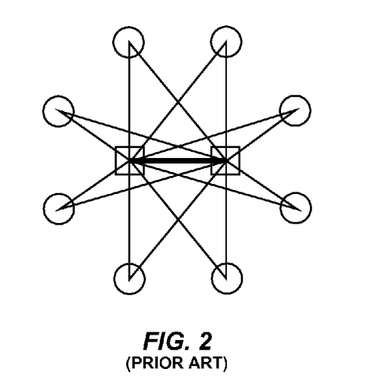
FIGS. 2 and 3 illustrate examples of network topologies commonly applied to backplane designs.
Figure 3:
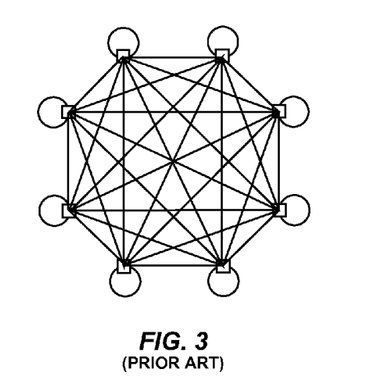

In many systems, the backplane is designed to support a star, a dual-star, a dual-dual-star or a fully-connected network topology. Depending on the network topology selected, more or fewer copper traces might be required on the backplane. As the number of traces increase, e.g., in the case of a fully-connected network topology, there is often a need to develop a multiple-layer backplane to account for all the traces required to interconnect all the blades. Common problems with copper-based backplane are related to the facts that copper interconnects require a lot of energy, are sensitive to interference, and offer a limited bandwidth capacity. In practice, this means that several parallel traces might be required to fulfill the bandwidth requirement for a given interconnect between two slots. FIGS. 2 and 3 show different interconnect topologies that are often incorporated into backplanes, namely the dual-dual star topology and the fully connected network topology, respectively.

To simplify the design of backplanes, system designers are increasingly considering the use of optical interconnects. In fact, optics-based solutions offer a much higher bandwidth per trace/interconnect, and are not sensitive to electro-magnetic interference. Both of these qualities simplify the development of backplanes. As optical-based technologies become the technology of choice for the future, copper backplanes will be gradually replaced by optical backplanes.

Figure 4:
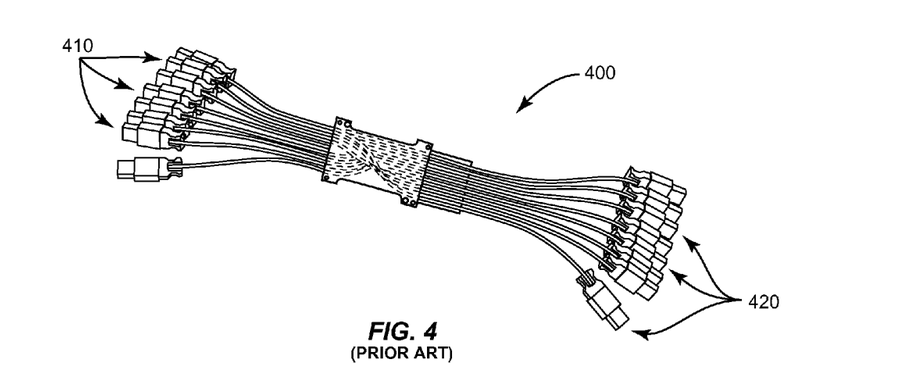
FIG. 4 illustrates an example of an optical shuffle.

One example of an optical backplane is illustrated in FIG. 4. Basically, an optical backplane can be seen as a group of optical fiber cables interconnected together in order to produce a network topology. In the example backplane 400 shown in FIG. 4, each of the connectors 410 and 420 includes multiple fiber ends, e.g., eight fibers per connector. In this configuration, the eight fibers extending from a connector 410 on the left-hand side of backplane 400 are distributed to the eight connectors 420 on the right-hand side of backplane 400. This configuration is typically referred to as an optical shuffle. When such an optical shuffle is installed on the back of a subrack in order to interconnect several subrack cards, it is referred to as an optical backplane. Note that it is also possible to integrate this same interconnection configuration (or others) into a backplane circuit board. Also note that in a subrack, the co-existence of a copper and an optical backplane is possible.

Figure 5:
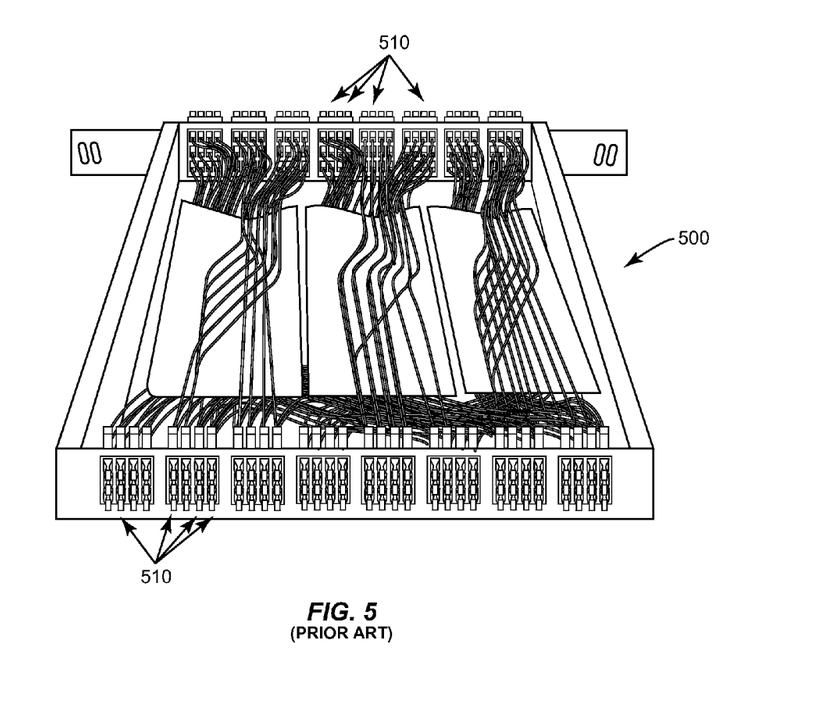
FIG. 5 shows an example of an optical shuffle box.

One or more optical shuffles can be packaged in a box, typically referred to as an optical shuffle box. An optical shuffle box can be used to interconnect several components of one or more systems. One difference between an optical backplane and an optical shuffle box is that the optical shuffle is not limited to interconnect the cards of a single subrack, nor is it limited to the use of backplane connectors, e.g., blind-mate connectors. One example of an optical shuffle box is shown in FIG. 5, where shuffle box 500 includes a large number of optical connectors 510 on both the front and back sides of the shuffle box 500. Once again, each of the optical connectors 510 may terminate several optical fibers, such as 24 fibers per connector. Optical cables are used to connect the optical connectors 510 to connectors on other subracks in the system.

With the continued growth of telecommunications and increasing requirements for flexibility in terms of interconnection specifications, the option of replacing copper backplanes with optical backplanes continues to become more attractive. However, the increasing size and complexity of these systems also tend to make system maintenance and system changes more difficult. Accordingly, improved solutions for optical interconnect systems are needed.

SUMMARY

There are several problems with existing approaches to the use of optical subrack backplanes. First, a subrack backplane is typically built and delivered with the subrack. As a result, it is typically not possible to change or select a new backplane topology of a subrack in the field. Further, using static topology configurations, it is not possible to flexibly require the most optimized topology interconnect for a given card. Still further, the backplane is located on the back of a subrack, which makes it difficult to reach for inspection or replacement. Finally, the typical backplane is a single component, which means that there is no option for redundancy of the component.

Several embodiments of the present invention address one or more of these problems. These embodiments include topology-defining card units and equipment subracks adapted for use with such topology-defining card units.

For instance, an example card unit adapted for installation in a slot of an equipment subrack having a plurality of slots and having a backplane includes one or more back-side optical connectors configured so as to mate with corresponding optical connector receptacles on the backplane of the equipment subrack when the card unit is installed in the equipment subrack. These one or more back-side optical connectors include a plurality of card-unit optical interfaces. The card unit further includes an optical interconnection network that optically couples each one of the plurality of card-unit optical interfaces to another one of the plurality of card-unit optical interfaces.

In some embodiments, the card unit comprises a circuit board. In some of these embodiments, the optical interconnection network includes a plurality of optical waveguides embedded in the circuit board. In others, an optical interconnection module is installed on the circuit board, and the optical interconnection module comprises a plurality of optical waveguides making up at least part of the optical interconnection network. The optical interconnection module may be a pluggable module, in some cases.

In several embodiments, the optical interconnection network defines a network topology among a plurality of groups of the card-unit optical interfaces, e.g., where each group corresponds to a particular one of several slots in a subrack. Possible network topologies include, but are not limited to: a star network topology; a dual-star network topology; a shuffle-exchange network topology; and a fully-connected network topology.

In some embodiments, multiple network topologies are supported by a single card unit. Thus, for example, the optical interconnection network of a card unit defines a first network topology among a first plurality of groups of the card-unit optical interfaces and a second network topology among a second plurality of groups of the card-unit optical interfaces. Possible network topologies for either or both of the first and second network topologies include the same topologies listed earlier. In some embodiments, the optical interconnection network is at least partly made up of one or more active components electrically controllable to define an interconnection topology among the card-unit optical interfaces.

Other embodiments of the present invention include equipment subracks adapted for use with topology-defining card units. An example subrack includes a plurality of slots, each configured to receive a removably inserted card, and a backplane having at least one optical connector receptacle aligned with each slot and configured to mate with a complementary optical connector on an inserted card, each optical connector receptacle comprising a plurality of optical interfaces. The backplane further includes a plurality of optical waveguides optically coupling each of the optical interfaces to another of the optical interfaces, such that the optical interfaces corresponding to a first one of the slots include optical interfaces coupled to corresponding optical interfaces in each of the remaining ones of the slots.

In some cases, the equipment subrack is designed for use with only a single topology-defining card unit. In this case, the optical interfaces corresponding to the remaining ones of the slots are coupled only to the first one of the slots, i.e., the slot reserved for the topology-defining card. Other embodiments may be designed for use with two or more topology-defining card units. In an example designed for use with two topology-defining cards, the backplane optical interfaces corresponding to each of the slots other than first and slots, reserved for topology-defining card units, are coupled only to either the optical interfaces of the first slot or the second slot.

Still further embodiments include any of the equipment subracks summarized above with a topology-defining card unit installed therein, e.g., a card unit including one or more back-side optical connectors configured so as to mate with the corresponding optical connector receptacles for the first slot on the backplane of the equipment subrack, the one or more back-side optical connectors comprising a plurality of card-unit optical interfaces, and an optical interconnection network that optically couples each one of the plurality of card-unit optical interfaces to another one of the plurality of card-unit optical interfaces. The optical interconnection network may define a network topology among the remaining ones of the slots, such as a star network topology, a dual-star network topology, a shuffle-exchange network topology, or a fully-connected network topology, for example.

In some cases, the topology-defining card unit's optical interconnection network defines an interconnection topology among the remaining ones of the slots in such a way as to interconnect a first number of optical interfaces for each of a first subset of slots with a second number of optical interfaces for each of a second subset of slots, the first number differing from the second number. In some embodiments the optical interconnection network on the card defines a first network topology among a first subset of the remaining ones of the slots and a second network topology among a second subset of the remaining ones of the slots.

Details of all of these embodiments are given below. Those skilled in the art will recognize additional features and advantages upon reading the following detailed description, and upon viewing the accompanying drawings.

BRIEF DESCRIPTION OF THE DRAWINGS

The elements of the drawings are not necessarily to scale relative to one another. Like reference numerals designate corresponding similar parts. The features of the various illustrated embodiments can be combined unless they exclude each other. Embodiments are depicted in the drawings and are detailed in the description which follows.

DETAILED DESCRIPTION

As discussed above, a subrack serves as a card "cage," where multiple equipment cards can be inserted. Conventionally, the subrack backplane is designed to manage the interconnection topology between the cards of a subrack. According to several embodiments of the present invention, however, part of that interconnection topology is provided by one or more of the subrack cards themselves.

A subrack according to these embodiments will allow several electronic cards to be inserted, as well as a new type of card unit. This new card unit is responsible for the topology of the interconnections between the other subrack cards, and is thus a topology-defining card. The form factor of this new card unit is similar to that of any other subrack card, so that the topology-defining card can be inserted in a subrack in the same manner as other cards. The topology-defining card can provide any of a wired variety of interconnection topologies between the remaining cards on the rack, including, for example, a star, a dual-star or a fully connected network topology.

It will be appreciated that such a topology-defining card could be replaced dynamically in a live system, e.g., given a newer, higher functionality card and/or new topology requirements. Likewise, several different topology-defining cards can be developed and made available to a system designer, so that any one of them can be selected at system deployment time, depending on the system topology requirement. Topology-defining cards may also be easily replaced in a later phase, e.g., for maintenance purposes.

As discussed in more detail below, some embodiments of the invention utilize a dedicated topology-defining card, where the card is designed solely to provide the interconnect topology for the remaining cards of a subrack. In other embodiments, however, a topology-defining module is added to an existing subrack card, so that the topology-defining card continues to provide the same functionality as the existing subrack card, in addition to providing an interconnection network to other cards in the subrack. For example, in a typical subrack configuration, a topology-defining module could be added to the switching cards, which are generally responsible for the networking functions of the subrack.

Apart from being responsible for the interconnect topology between the cards of a subrack, a topology-defining card may also be designed to manage more efficiently the bandwidth made available to the individual cards of the subrack. In fact, it becomes possible to envision that no bandwidth capacity would be wasted because a card could not process it, since a replaceable topology-defining card can be used to ensure that the otherwise unused capacity can be redirected to another card that could take advantage of the extra bandwidth capacity.

In some embodiments, more than one topology-defining card is used in a subrack. This type of configuration allows for redundancy of functionality, which could permit, for example, one topology-defining card to be replaced while another remains responsible for the active interconnections between the subrack cards.

It is also possible to support multiple interconnect topologies simultaneously between the subrack cards. In this scenario, each topology can be completely independent of each other.

Figure 6:
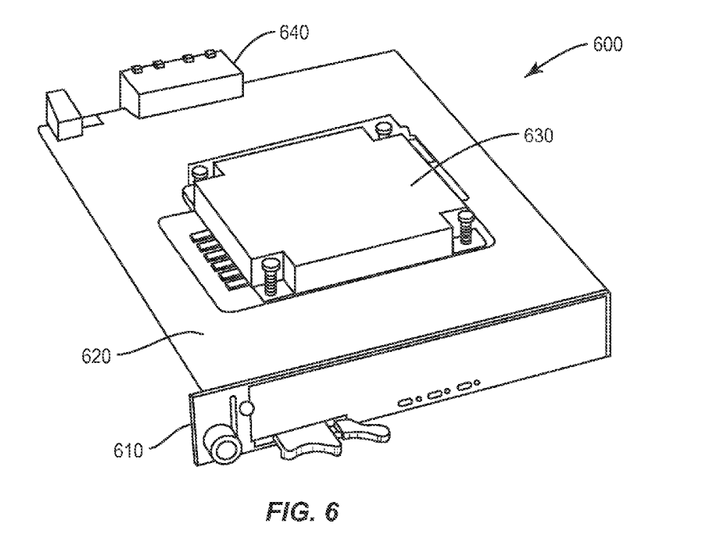
FIG. 6 illustrates an example of a subrack card.

FIG. 6 illustrates an example subrack card 600, which includes a front-panel portion 610, a circuit board 620, an opto-electronic module 630, and a backside connector assembly 640. Subrack card 600 can be inserted into a subrack so that the backside connector 640 mates with a corresponding connector on the backplane of the subrack. The subrack typically includes guides that facilitate the alignment of the card 600 and its backside connector with the corresponding connector on the subrack's backplane, as the card 600 is slid into the subrack. A locking mechanism may also be supplied to ensure that the card 600 remains securely mated to the backplane.

Figure 7:
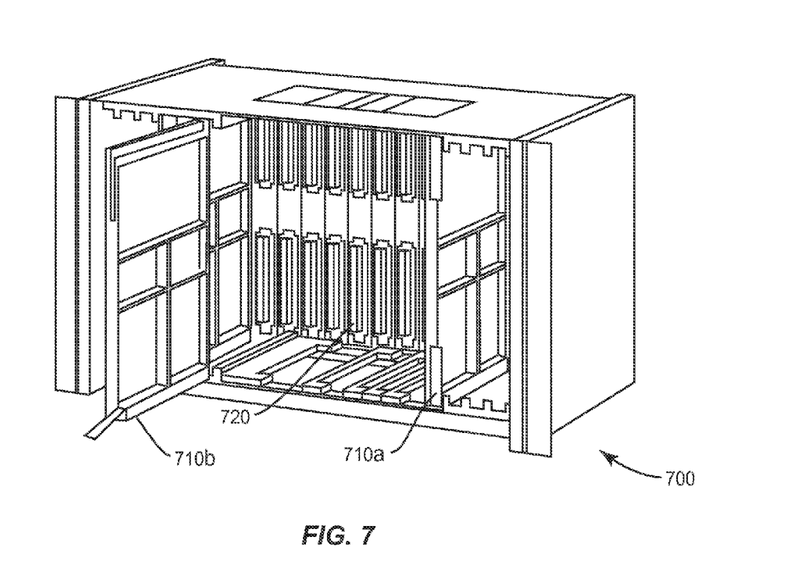
FIG. 7 shows a subrack filled with cards connected to a subrack backplane.

FIG. 7 illustrates an example subrack 700 with a first subrack card 710a fully installed and connected to backplane 720 and a second subrack card 710b only partially installed. Several additional slots are available for additional subrack cards 710; depending on the system design and the backplane topology, the subrack may be used with only a few cards installed. In some systems, the system capabilities may be upgraded by simply installing additional equipment cards in one or more of the empty slots.

The use of the subrack concept in system design allows systems to be built with different types of cards, depending on the system requirements, while using identical subracks. For example, while one system may require cards with a specific type of processor, another system could require another type of cards equipped with another type of processor. Building systems with the concept of a generic subrack, where multiple types of cards can be developed and co-exist independently and/or simultaneously, thus represents a great advantage for flexibility in a system design.

While the possibility of inserting multiple cards in the same subrack allows sharing several system-related functions between the cards, such as power and cooling, there might also be a fundamental requirement to allow the cards to communicate with one another. As discussed above, the backplane of the subrack interconnects the several cards housed by the subrack and, in a conventional system, statically defines the interconnection topology among the cards. However, in several embodiments of the invention, at least part of the responsibility for defining the interconnection topology among the cards in a subrack is built into one or more of the subrack cards themselves.

Figure 8:
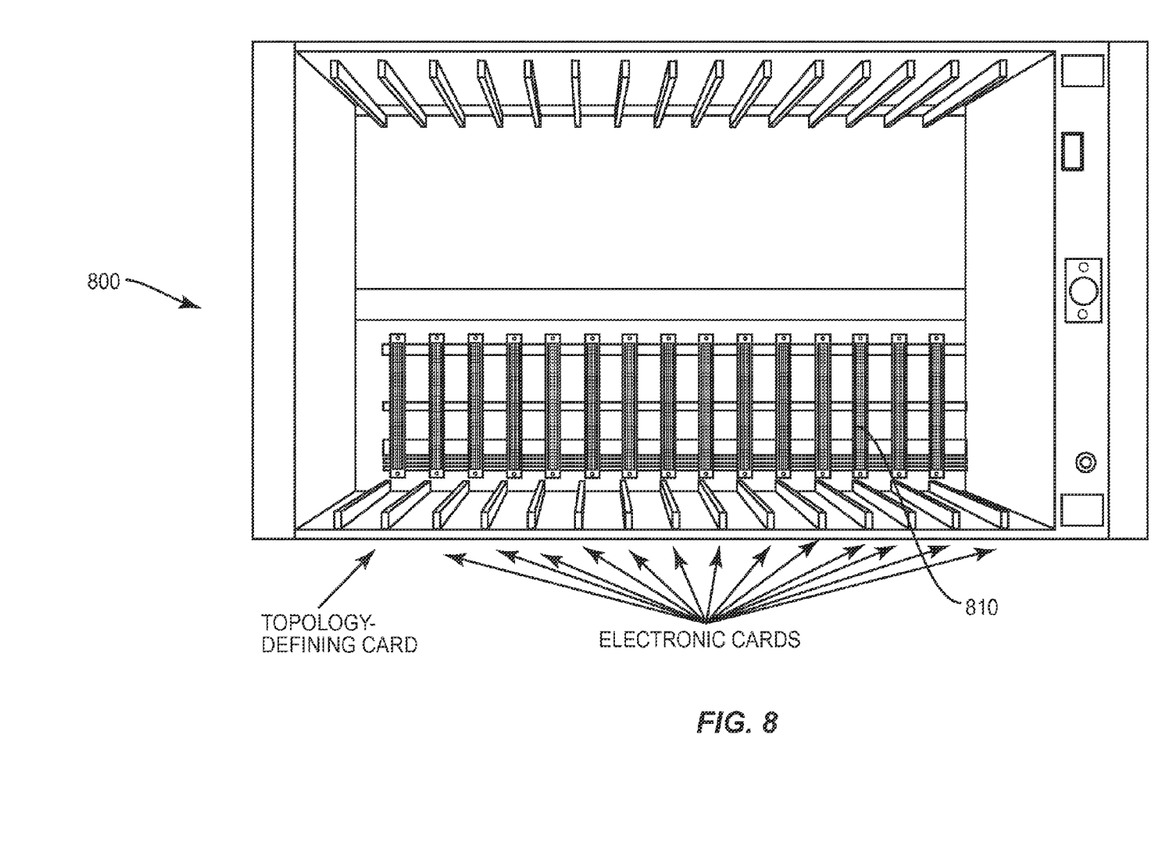
FIG. 8 illustrates an example of a subrack having a backplane supporting topology-defining cards.

FIG. 8 illustrates a subrack 800 that allows several electronic/opto-electronic cards to be inserted, as well as a new type of card, a topology-defining card unit that is responsible for the topology of the interconnections between other cards in the subrack. This new topology-defining card unit is inserted into a subrack, in a manner similar to any other subrack card, and can provide any of a variety of interconnection topologies, including, for example, the well-known star, dual-star, or fully connected network topologies.

In some embodiments, such as the embodiment pictured in FIG. 8, the topology-defining card unit must be inserted into a specifically reserved location in the subrack 800. For example, in reference to current typical subrack designs, a specific location for such a new topology-defining card could be in one of the locations reserved for the switching-related cards. The backplane 810 has a fixed backplane topology and is responsible for redirecting the backplane connections from each card plugged into the backplane to the topology-defining subrack card or cards.

In other words, an equipment subrack according to several embodiments of the present invention has a plurality of slots, each configured to receive a removably inserted card. The subrack further includes a backplane, which includes at least one optical connector receptacle aligned with each slot and configured to mate with a complementary optical connector on an inserted card. Each optical connector and optical connector receptacle includes a plurality of optical interfaces. Example connector types include the MPO and MTP connectors, which are multiple-fiber push-on/pull-off connector systems typically used for indoor cabling and device interconnections. The backplane further includes a plurality of optical waveguides optically coupling each of the optical interfaces to another of the optical interface. In particular, the backplane couples optical interfaces for a first one of the slots, i.e., a slot reserved for a topology-defining card unit, to corresponding optical interfaces in each of the remaining ones of the slots. Thus, the topology-defining card unit is interconnected to each of the other slots in the subrack. In some cases, each of these other slots is coupled only to the slot for the topology-defining card unit, so that any interconnections among these slots must be provided by the topology-defining card unit itself.

In the subrack 800 pictured in FIG. 8, for example, a total of fifteen slots are available. Fourteen of these slots are available for electronic/opto-electronic equipment cards, while one is reserved for the topology-defining card. When installed, each of the fourteen electronic/opto-electronic cards is connected to the backplane 810, which includes optical waveguides interconnecting optical connections from all fourteen of the electronic/opto-electronic cards to the slot reserved for the topology-defining card. These optical waveguides may be built into a backplane circuit board, for example, or may comprise optical fibers and/or optical cables.

Since the backplane 810 physically connects all fourteen electronic/opto-electronic cards to the topology-defining card, it becomes possible for the topology-defining card to be responsible for the system interconnect topology. For example, the topology-defining card could be responsible for providing a star, a dual-star or a fully-connected topology in the system.

Figure 9:
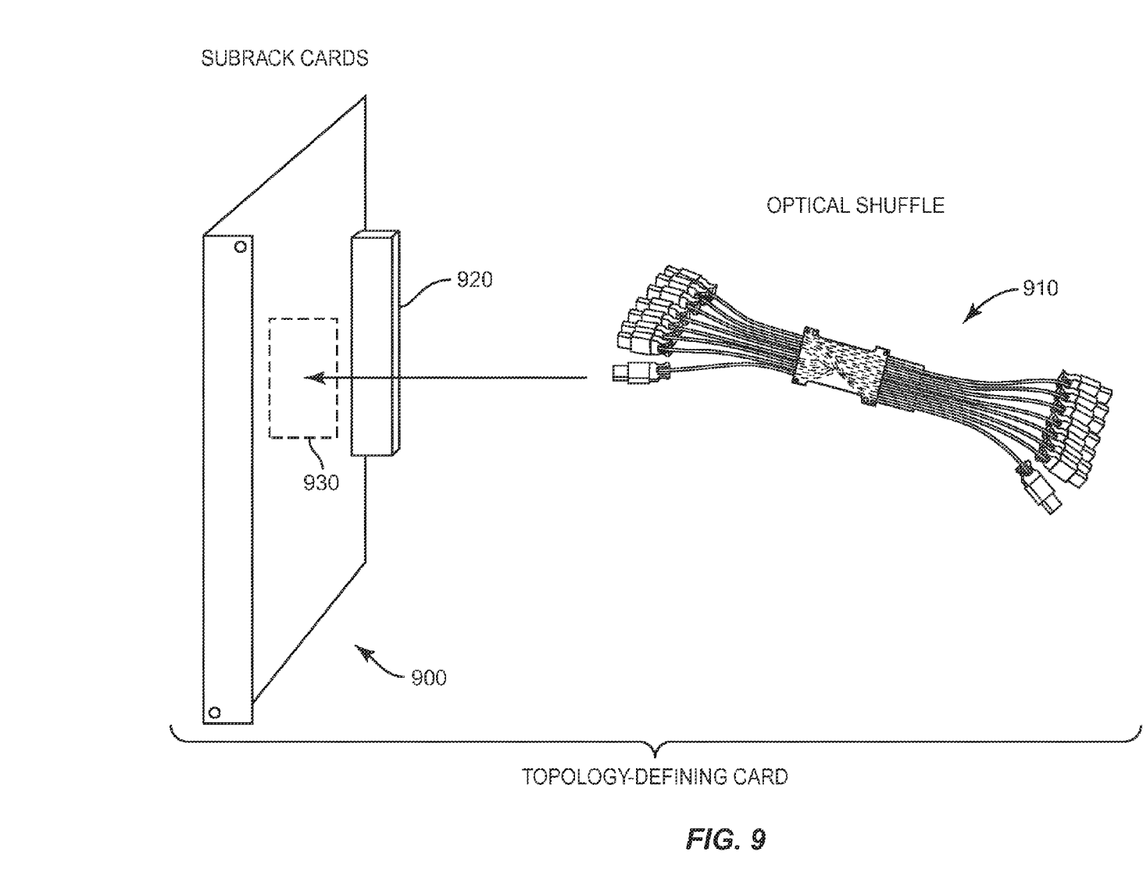
FIG. 9 shows an example of a topology-defining card based on an optical shuffle.

A topology-defining card can be completely passive, or active. In the case where a topology-defining card is purely based on optical interfaces, it is possible to have a completely passive card. As shown in FIG. 9, a passive topology-defining card unit 900 could be built using the concept of an optical shuffle 910, where the optical shuffle 910 provides the required optical interconnection for the desired topology. In such an example, the back-side backplane connector 920 located on the card unit 900 optically connects to an optical shuffle interconnection network 930 on the card unit 900 or integrated into the card unit 900. The interconnection network 930 is then responsible for mapping the incoming links from the backplane connector 920 to other, outgoing links on the same backplane connector 920. Basically, the topology-defining card unit 900 is used to map incoming backplane connections to outgoing backplane connections on the card. By doing so, it is possible for the topology-defining card to act as a connection mapping card for the remaining cards in the subrack.

While some embodiments of the topology-defining card unit are completely passive, there might also be requirements for active versions of the card, where optical and/or electrical signals could require specific processing. For example, active electronic components could be included on the topology-defining card, in order to provide signal processing or conversion. In some cases, one or more active components on the topology-defining card are used to perform the required interconnection between the cards of the subrack. These components may act, for example, in the manner of an electrical or optical crossbar.

In several embodiments, then, a card unit is adapted for installation in a slot of an equipment subrack having several slots and having a backplane. The card unit includes one or more back-side optical connectors configured so as to mate with corresponding optical connector receptacles on the backplane of the equipment subrack when the card unit is installed in the equipment subrack. The one or more back-side optical connectors include a plurality of card-unit optical interfaces. The card unit further includes an optical interconnection network that optically couples each one of the plurality of card-unit optical interfaces to another one of the plurality of card-unit optical interfaces. In some cases, the optical interconnection network includes optical waveguides embedded in a circuit board. In some instances, the card unit includes a topology-defining optical interconnection module installed on the circuit board, the optical interconnection module including a plurality of optical waveguides making up at least part of the optical interconnection network. Whether integrated into a circuit board or included in a topology-defining module, the optical interconnection network in some embodiments defines a network topology among a plurality of groups of the card-unit optical interfaces, e.g., with each group corresponding to a particular slot in the equipment subrack. Examples of possible network topologies include: a star network topology; a dual-star network topology; a shuffle-exchange network topology; and a fully-connected network topology.

The subrack backplane could be electrical or optical, as suggested for the topology-defining card. However, an optical backplane with one or multiple optical passive topology-defining cards provides the high speeds and low latencies required for complex, modern telecommunications systems.

Figure 10:
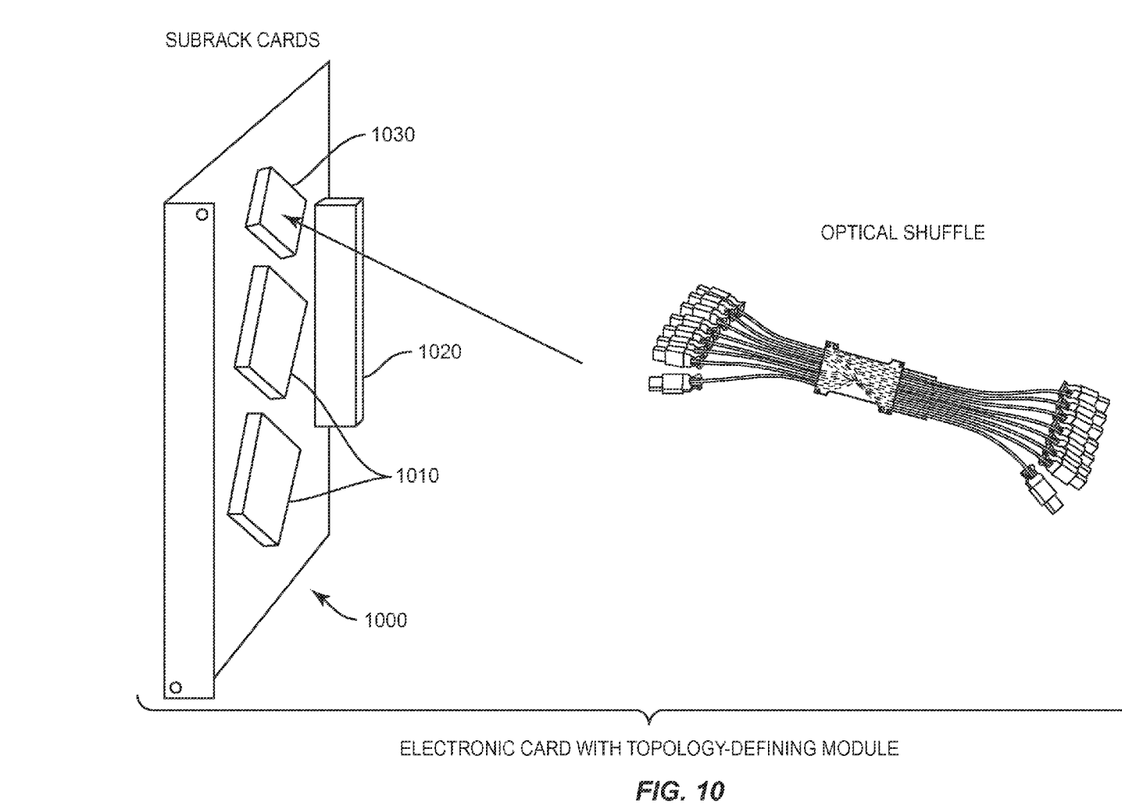
FIG. 10 illustrates a subrack card equipped with a topology-defining module.

Instead of a dedicated topology-defining card, where the card is only capable of providing the interconnect topology of the cards of a subrack, a topology-defining module can be added to an existing subrack card, which may continue to perform the same function as before in addition to providing an interconnect topology for other cards in the subrack. For example, in a typical subrack configuration, a topology-defining module could be added to the switching cards, which are responsible for the networking functions of the subrack. An example of this approach is shown in FIG. 10, where topology-defining card 1000 includes one or more electronic and/or opto-electronic modules 1010, which perform switching or other functions. The topology-defining functionality of the card is provided by optical module 1030, which is added to available extra space on the subrack card. Optical connector assembly 1020 provides the optical interconnections to the subrack backplane and hence to other cards in the subrack.

Note that a topology-defining module such as the module 1030 in FIG. 10 could be a fixed module, i.e., permanently attached to the card unit, or a pluggable module. While a fixed module could provide a very compact topology for the subrack interconnect, it would not allow the topology to be changed dynamically. For that specific purpose, a pluggable module would be a better option, allowing more flexibility in terms of selecting the right topology-defining module based on the deployed system. A topology-defining module could be active or passive. It could also require electronic devices with electrical connections, or be purely based on optical interconnections. In some cases, the approach used to install the topology-defining module on the subrack card could be similar to that used to support daughter cards in electronics applications. Typically, daughter cards, also called mezzanine cards, can be removably mounted on a base board in order to provide the required functionality of the card, in a modular configuration.

In addition to being generally responsible for the interconnect topology between the cards of a subrack, a topology-defining card can also be used to manage more efficiently the bandwidth made available to the various individual cards of a subrack. Assume, for example, that different types of cards are used in a single subrack. One type of cards might require a bandwidth of 40 Gbps, for instance, while another one provides only a maximum of 10 Gbps. In such a case, the configuration of the subrack could allow certain types of cards to be located in specific locations in the subrack, in order to allow a topology-defining card to only interconnect the most optimized bandwidth for each processing card. As an example, by doing so, it becomes possible to fully take advantage of all the system switching capacity. In fact, it becomes possible to envision that no bandwidth capacity would be wasted because a card could not process it, since the unused capacity could rather be redirected to another card that could take advantage of the extra bandwidth capacity.

Figure 11:
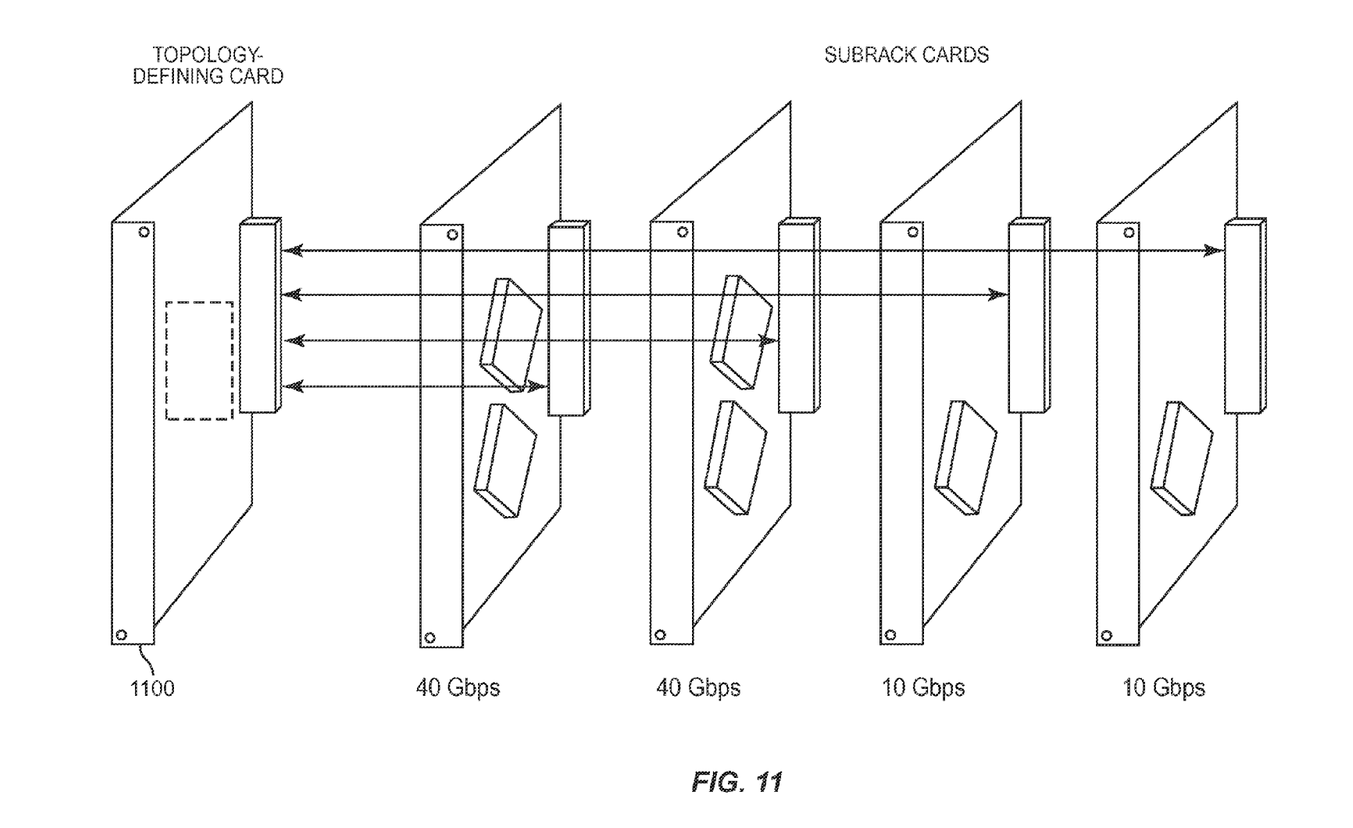
FIG. 11 illustrates a subrack where cards might have different bandwidth requirements that can be taken into account by the topology-defining cards.

This approach is illustrated in FIG. 11, where topology-defining card unit 1100 defines an interconnect topology among the other subrack cards that takes into account the different bandwidth requirements for each card/slot. In some cases this is achieved by designing the topology-defining card unit so that it interconnects a different number of optical interfaces from the various cards, depending on the cards' bandwidth support. Thus, topology-defining card unit 1100 may define an interconnection topology that interconnects a first number of optical interfaces for each of a first subset of slots (e.g., the slots for 40 Gbps cards) with a second number of optical interfaces for each of the second subset of slots (e.g., the slots for 10 Gbps cards), the first number differing from the second number.

Given the flexibility provided by the topology-defining card unit, it should be clear that such a card could be replaced dynamically in a live system, to take advantage of newer cards and/or new topology requirements. Several different topology-defining cards compatible with a given subrack design can be developed, so that any one of them can be selected at system deployment, based on the system topology requirement. Topology-defining cards can also be replaced in a later phase for maintenance purposes. Likewise, topology-defining modules can be changed dynamically, assuming that the modules are designed for pluggability and easy replacement.

Further flexibility can be achieved with the use of more than one topology-defining card in a subrack. This type of configuration can allow for some redundancy of functionality, for example. Accordingly, in some embodiments one topology-defining card can be replaced while another is responsible for the active interconnect between the subrack cards. In some embodiments according to this scenario, all the subrack cards are connected to multiple topology-defining cards or modules that have the same topology interconnection scheme. In some cases, the total bandwidth capacity of each card is divided between the topology-defining cards or modules, e.g., equally. With this approach, each card always remains in contact with all the other cards of the subrack, even if one of the topology-defining cards or modules fails or is removed. In this example, it could be possible that a graceful degradation of service be required on the system, depending whether the interconnect network was configured in an active-active or an active-standby configuration.

It is also possible to use topology-defining cards to simultaneously support multiple interconnect topologies between the subrack cards. In some embodiments, each topology is completely independent from the others, and each is as flexible as described above.

Figure 12:
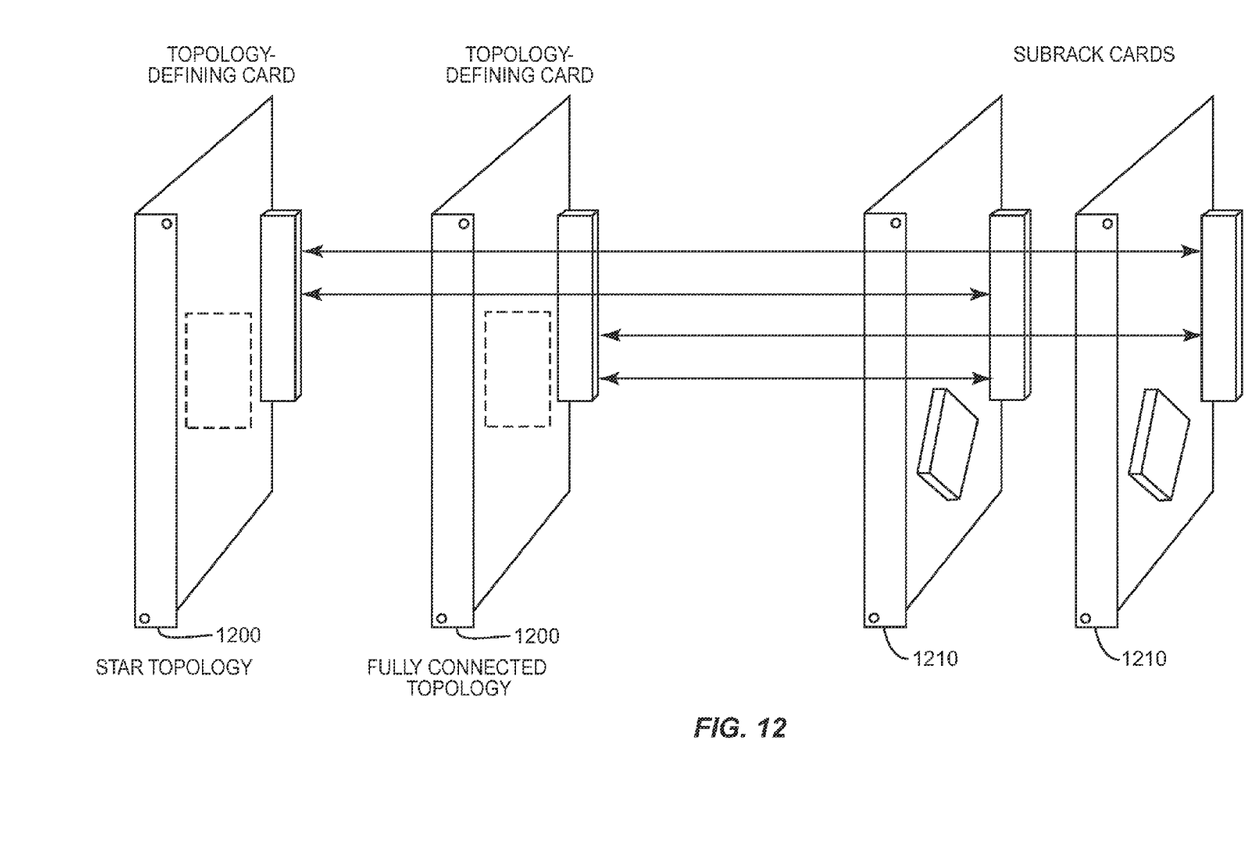
FIG. 12 shows an example of a subrack where two different subrack network topologies are used to interconnect the subrack cards.

An example of this approach is shown in FIG. 12. In this example, each of the subrack cards 1210 is connected to two topology-defining card units 1200. Thus, multiple cards are used to provide the required interconnect topologies between the subrack cards, here a star topology and a fully connected topology. It will be appreciated that two interconnect topologies can be provided on a single card, e.g., using two separate topology-defining modules.

Several embodiments of the present invention have been described above, including topology-defining card units, topology-defining modules, and subrack systems adapted for use with one or more topology-defining card units. These embodiments can provide a number of advantages, in various scenarios. First, the interconnect topology between subrack cards in a system becomes independent of the subrack backplane. The interconnect topology within a subrack can be dynamically selected at deployment time, with many different topology options possible. It further becomes possible to replace dynamically an interconnect topology of a subrack for maintenance purposes by replacing the topology-defining card or module, or to provide a redundant topology-defining card or module, in order to possibly provide seamless topology maintenance. It is also possible to use active components in order to control the interconnect topology of a subrack. It is still further possible to create purpose-built interconnect topologies based on the different bandwidth capacity of the different cards used in a subrack. Finally, it becomes possible to support multiple interconnect topologies in the same subrack, where each topology could be different from each other, and be maintained independently.

It should be appreciated that in the preceding discussion, terms such as "first", "second", and the like, are used to distinguish various elements, regions, sections, etc., from one another and are not intended to imply a particular order or priority, unless the context clearly indicates otherwise. Like terms refer to like elements throughout the description. Likewise, as used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise. When a process is illustrated or claimed herein, it should be understood that the steps or operations of that process may be performed in any order unless the context clearly requires otherwise. Finally, it is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the appended claims and the equivalents thereof.

What is claimed is:

1. A card unit adapted for installation in a slot of an equipment subrack having a plurality of slots and having a backplane, the card unit comprising:
   one or more back-side optical connectors configured so as to mate with corresponding optical connector receptacles on the backplane of the equipment subrack when the card unit is installed in the equipment subrack, the one or more back-side optical connectors comprising a plurality of card-unit optical interfaces; and
   an optical interconnection network that optically couples each one of the plurality of card-unit optical interfaces to another one of the plurality of card-unit optical interfaces.

2. The card unit of claim 1, further comprising a circuit board, wherein the optical interconnection network comprises a plurality of optical waveguides embedded in the circuit board.

3. The card unit of claim 1, further comprising a circuit board and an optical interconnection module installed on the circuit board, wherein the optical interconnection module comprises a plurality of optical waveguides making up at least part of the optical interconnection network.

4. The card unit of claim 3, wherein the optical interconnection module installed on the circuit board is a pluggable module.

5. The card unit of claim 1, wherein the optical interconnection network defines a network topology among a plurality of groups of the card-unit optical interfaces, and wherein the network topology is selected from the group consisting of:
- a star network topology;
- a dual-star network topology;
- a shuffle-exchange network topology; and
- a fully-connected network topology.

6. The card unit of claim 1, wherein the optical interconnection network defines a first network topology among a first plurality of groups of the card-unit optical interfaces and a second network topology among a second plurality of groups of the card-unit optical interfaces, and wherein at least one of the first and second network topologies is selected from the group consisting of:
- a star network topology;
- a dual-star network topology;
- a shuffle-exchange network topology; and
- a fully-connected network topology.

7. The card unit of claim 1, wherein the optical interconnection network comprises one or more active components electrically controllable to define an interconnection topology among the card-unit optical interfaces.

8. An equipment subrack, comprising:
- a plurality of slots, each configured to receive a removably inserted card;
- a backplane comprising:
  - at least one optical connector receptacle aligned with each slot and configured to mate with a complementary optical connector on an inserted card, each optical connector receptacle comprising a plurality of optical interfaces, and
  - a plurality of optical waveguides optically coupling each of the optical interfaces to another of the optical interfaces, such that the optical interfaces corresponding to a first one of the slots include optical interfaces coupled to corresponding optical interfaces in each of the remaining ones of the slots; and
- a card unit inserted in a first slot, the card unit comprising:
  - one or more back-side optical connectors configured so as to mate with the corresponding optical connector receptacles for the first slot on the backplane of the equipment subrack, the one or more back-side optical connectors comprising a plurality of card-unit optical interfaces, and
  - an optical interconnection network that optically couples each one of the plurality of card-unit optical interfaces to another one of the plurality of card-unit optical interfaces.

9. The equipment subrack of claim 8, wherein the optical interfaces corresponding to the remaining ones of the slots are coupled only to the first one of the slots.

10. The equipment subrack of claim 8, wherein the optical interfaces corresponding to a second one of the slots include optical interfaces coupled to each of the remaining slots.

11. The equipment subrack of claim 10, wherein the optical interfaces corresponding to each of the slots other than the first and second slots are coupled only to either the optical interfaces of the first slot or the second slot.

12. The equipment subrack of claim 8, wherein the optical interconnection network defines a network topology among the remaining ones of the slots, and wherein the network topology is selected from the group consisting of:
- a star network topology;
- a dual-star network topology;
- a shuffle-exchange network topology; and
- a fully-connected network topology.

13. The equipment subrack of claim 8, wherein the optical interconnection network defines an interconnection topology among the remaining ones of the slots, and wherein said interconnection topology is configured to interconnect a first number of optical interfaces for each of a first subset of slots with a second number of optical interfaces for each of a second subset of slots, the first number differing from the second number.

14. The equipment subrack of claim 8, wherein the optical interconnection network defines a first network topology among a first subset of the remaining ones of the slots and a second network topology among a second subset of the remaining ones of the slots, and wherein at least one of the first and second network topologies is selected from the group consisting of:
- a star network topology;
- a dual-star network topology;
- a shuffle-exchange network topology; and
- a fully-connected network topology.

* * * * *